United States Patent [19]

Korr

[11] 4,136,674

[45] Jan. 30, 1979

[54] SYSTEM FOR SOLAR RADIATION ENERGY COLLECTION AND CONVERSION

[75] Inventor: Abraham L. Korr, Philadelphia, Pa.

[73] Assignee: A. L. Korr Associates, Inc., Philadelphia, Pa.

[21] Appl. No.: 819,753

[22] Filed: Jul. 28, 1977

[51] Int. Cl.² ............................................. F24J 3/02
[52] U.S. Cl. .................................... 126/271; 60/641; 126/270
[58] Field of Search ................... 126/270, 271; 60/641; 350/288, 289, 6, 104, 6.1, 6.6, 6.9, 6.91; 353/3; 250/203 R; 134/63, 78–81

[56] References Cited

U.S. PATENT DOCUMENTS

| 260,657 | 7/1882 | Calver | 126/270 |
|---|---|---|---|
| 608,755 | 8/1898 | Cottle | 60/641 X |
| 3,886,958 | 6/1975 | Diebel et al. | 134/80 |
| 3,924,604 | 12/1975 | Anderson | 60/641 X |
| 3,934,573 | 1/1976 | Dandini | 126/270 |
| 3,979,597 | 9/1976 | Drucker | 60/641 |
| 4,015,585 | 4/1977 | Fattor | 237/1 A |

OTHER PUBLICATIONS

"Status Report on a High Temperature Solar Energy System," Report Sand 74-8017, U.S. Atomic Energy Commission under contract at (29–1) - 789, pp. 99–104.

Primary Examiner—William F. O'Dea
Assistant Examiner—Larry Jones
Attorney, Agent, or Firm—Howson and Howson

[57] ABSTRACT

A solar radiation energy collecting system for receiving the sun's rays and focusing them upon a central absorber. A plurality of plane mirrors are mounted in a circular array concentric with a vertical absorber tower, the azimuth angle of each of the mirrors being fixed in the array at the particular angle necessary for it to reflect rays from the sun upon the absorber tower. The mirror array is mounted upon a boat floating on a pond and the boat and mirror array rotated in synchronism with the daily apparent motion of the sun, so as to maintain the desired focusing of reflected solar radiation upon the absorber tower. In one simple embodiment the mirrors are rotated only in a horizontal plane about the vertical axis of the absorber tower, and the varying elevation angles of the sun cause the reflected solar energy to scan up and down along the length of the absorber tower as the sun moves from east to west each day. The absorber tower preferably comprises conduits for delivering fluid to be heated into parts of the tower impinged by the reflected solar radiation energy, and for removing the heated fluid from the tower to a location at which the absorbed heat energy is to be utilized. In some cases the part of the boat not occupied by the above-identified mirrors may be substantially covered with horizontal trough-like reflectors having heat absorbing members disposed along their respective aligned foci, so as to obtain useful solar energy collection from this latter portion of the rotating boat assembly. In other cases the plane-mirror array may be continued around the entire circumference of the boat, especially where the apparatus is utilized in positions near the equator.

7 Claims, 13 Drawing Figures

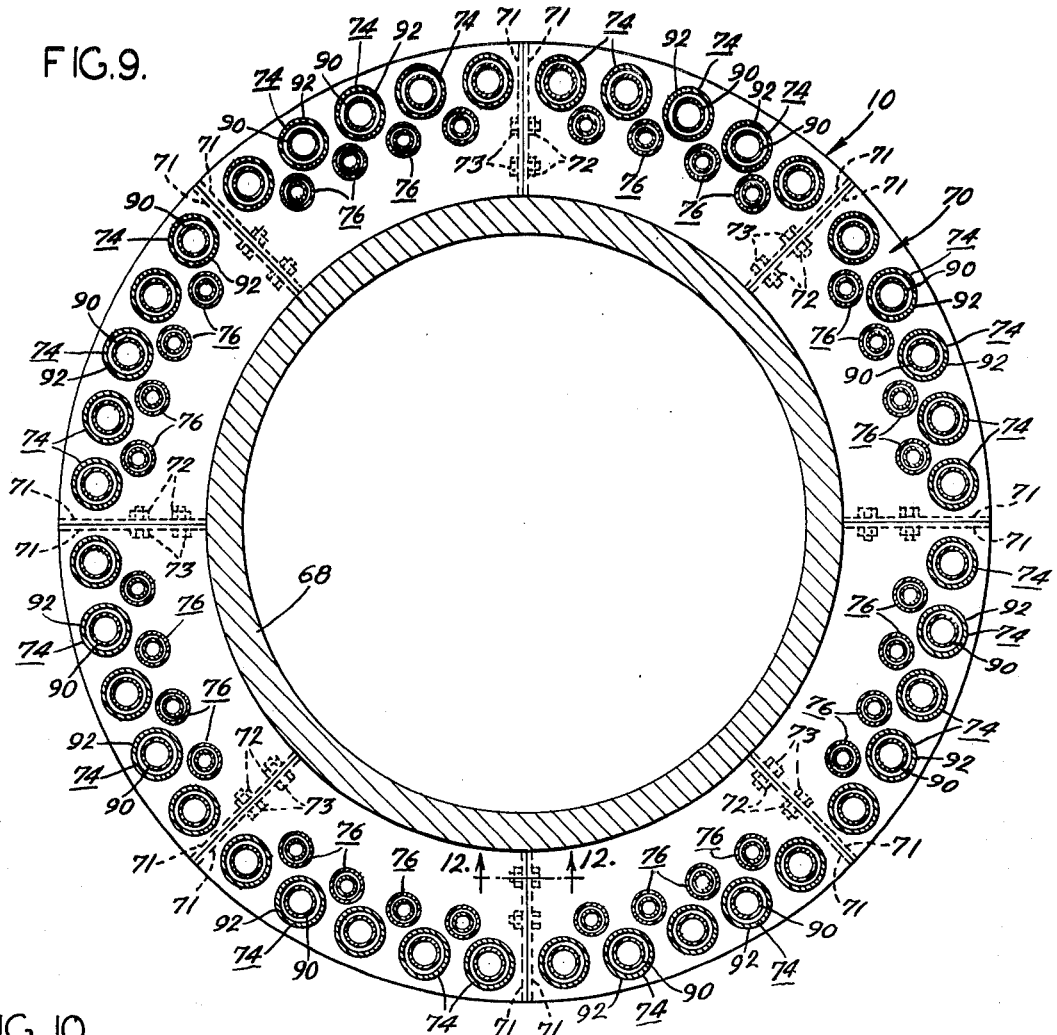
FIG. 9.
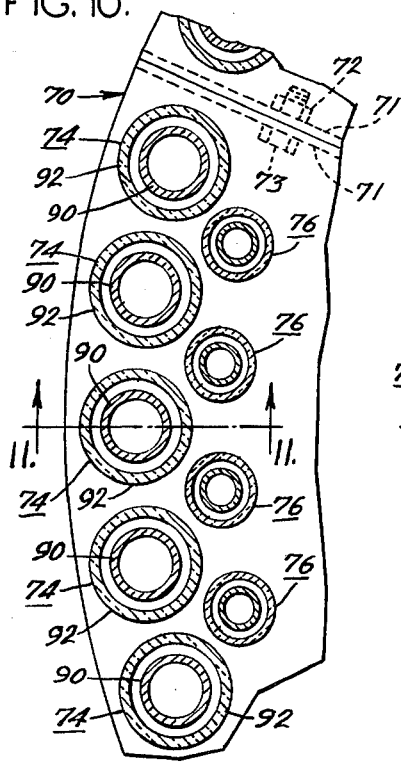
FIG. 10.
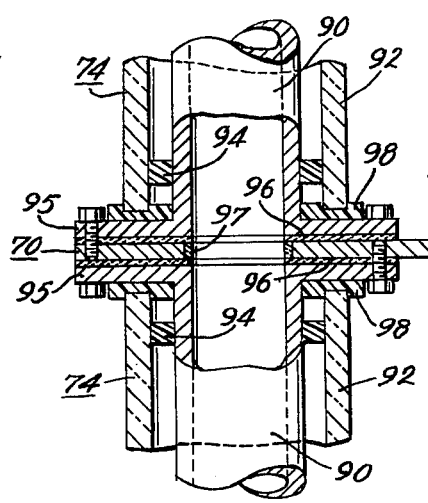
FIG. 11.
FIG. 12.

SYSTEM FOR SOLAR RADIATION ENERGY COLLECTION AND CONVERSION

BACKGROUND OF THE INVENTION

In the co-pending U.S. patent application Ser. No. 783,069 filed Mar. 30, 1977, there is described a system in which an array of horizontal trough-like reflectors, each provided with a solar energy absorber disposed along its line focus, is continuously rotated so that the line foci remain in vertical planes passing substantially through the apparent sun position, their rotation being accomplished by continuous rotation of a boat floating in a pond and supporting the trough-like reflectors. Each of the plurality of energy absorbers is supplied with a flow of heat-absorbing fluid, which is heated during its passage through the absorber, the heated fluid then being utilized for any desired purpose, such as producing mechanical motion or electrical current generation.

While effective for many purposes, the system does usually require a relatively complex arrangement of piping for supplying each of the absorbers with fluids to be heated, and for carrying the heated fluid away to the point of utilization, particularly in view of the fact that this transporting of the heat-carrying fluid must pass through some type of rotating or flexible joint, since the reflectors are on the revolving boat and the energy utilization apparatus will normally be on the fixed ground.

It is therefore an object of the present invention to provide a new and useful system for the collection of solar radiation energy, and for converting it to heat energy for transfer to a location at which it is to be utilized.

Another object is to provide such apparatus which does not require the use of flexible or rotating joints for the transfer of the heat-absorbing fluid, and which is otherwise relatively simple in construction and operation.

SUMMARY OF THE INVENTION

These and other objects of the invention are obtained by the provision of apparatus for the collecting of solar radiation energy and for converting it to heat energy, which comprises a central absorber of solar radiation energy, mirror support means, mirror means positioned on said mirror support means to provide reflection of said solar radiation energy onto said central absorber, and means for rotating the mirror support means about an axis through the central absorber at a rate synchronized with the daily apparent east-west motion of the sun so as to maintain said reflection of said solar radiation energy upon said central absorber during the motion of the sun.

Preferably the rotation is performed about a substantially vertical axis, and the central absorber is preferably substantially vertical with respect to the earth. Preferably also, in the interest of simplification, the rotation of the mirror support means is substantially in a single horizontal plane, the mirror means are fixed in elevation angle, and the central absorber is sufficiently great in length that radiation from the sun is reflected upon some portion of the absorber over a major part of the daylight hours despite the fact that the elevation of the sun varies substantially during such hours.

In the preferred form, and according to a further combinational feature of the invention, the support means for the mirror means comprises buoyant means such as a boat, on which the mirror means are mounted, and the system includes flotation means such as a pond for floating the buoyant means, so that the buoyant means can be easily rotated continuously in synchronism with the apparent motion of the sun. Preferably the buoyant means, e.g. the boat floating in the pond, is rotated continuously in a clockwise direction as viewed from above when used in the northern hemisphere north of the Tropic of Cancer, and rotated in the opposite direction when used in the southern hemisphere south of the Tropic of Capricorn; in the Tropics, the direction of rotation depends on the season, i.e. whether the sun is north or south of the installation. In the interest of simplicity, the central absorber in the form of a tower may be mounted upon the earth-fixed location within the arc occupied by the mirror means, and the energy utilization plant or the like may also be located in this same earth-fixed location adjacent the solar energy absorber; a suitable heat-transfer medium, such as water, is caused to flow through the portion of the absorber impinged by the reflected light, wherein it is heated and then returned to the energy utilization position to produce mechanical motion or electrical power generation, as examples.

This system embodies many of the advantages of the system of our above-cited co-pending application, for example with respect to the ease of turning of the mirror array provided by the floating-boat arrangement and the simplicity of control of mirror orientation in that it is not necessary to effect individual adjustment of the azimuth angles of the mirrors, this being provided by the rotation of the complete array; the covering of the pond by the floating boat also provides some protection against evaporation of the water in hot, low-humidity climates. However, in addition it embodies the advantage that the solar heating effect from all mirrors is concentrated on a common stationary absorber, with resultant simplification in conveying the cool fluid and the heated fluid between the common central absorber and the heat-utilization station.

BRIEF DESCRIPTION OF FIGURES

These and other objects of the invention will be more readily understood from a consideration of the following detailed description, taken in connection with the following drawings, in which:

FIG. 9 is a horizontal sectional view, taken along lines 9—9 of FIG. 1;

FIG. 10 is an enlarged view of a fragment of FIG. 9;

FIG. 11 is a fragmentary vertical section showing the joining and support of the individual solar collection tubes;

FIG. 12 is a view along lines 12—12 of FIG. 9; and

DETAILED DESCRIPTION OF SPECIFIC EMBODIMENTS

Without thereby in any way limiting the scope of the invention, a representative embodiment of the invention will now be described in detail, with reference to the drawings.

Figure 1:
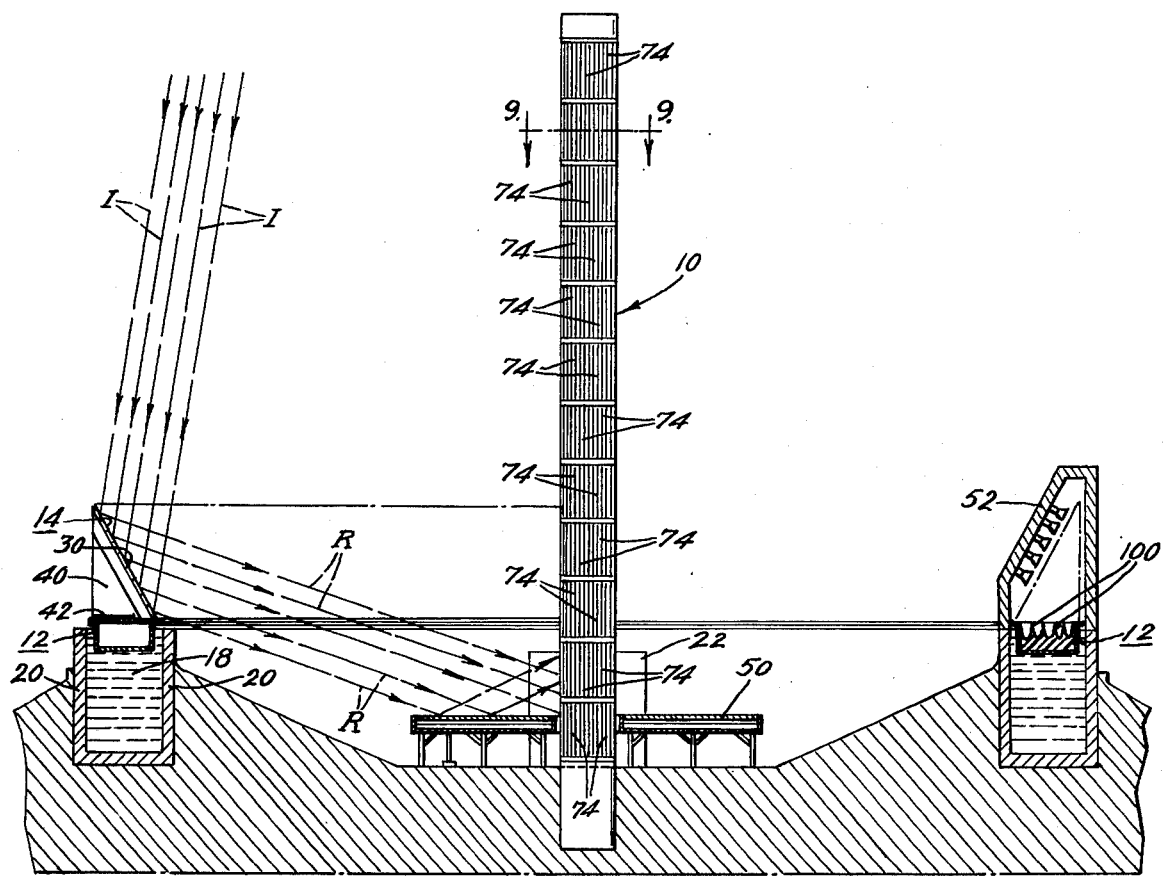
FIG. 1 is a vertical sectional view taken along lines 1—1 of FIG. 2, with parts shown in full, of a representative embodiment of the invention.
Figure 2:
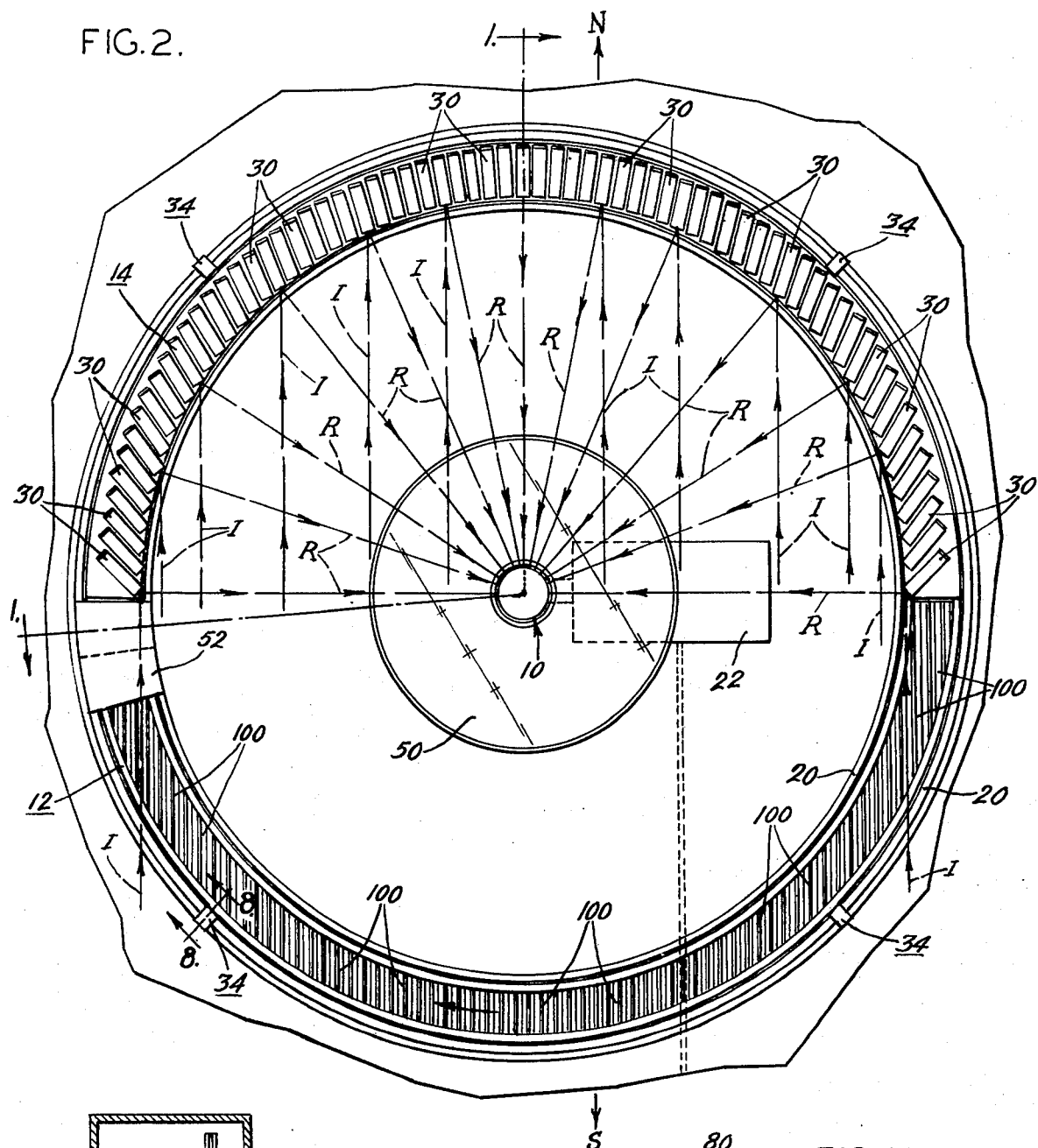
FIG. 2 is a plan view of the embodiment of FIG. 1, as it would appear at noon.

Referring first particularly to FIGS. 1 and 2, a central solar radiation absorber 10 is provided in the form of a vertical tower, which may be embedded in the ground below grade at its lower end, and supported by suitable underground construction work and/or by appropriate guide wires connected near its top end (not shown). Concentrically surrounding the tower 10 are buoyant means 12, referred to hereinafter as a boat, on which are supported mirror means 14 in the form of an arcuate array of plane mirrors. The tower 10 in this example is stationary with respect to the ground, while the boat 12 carrying the mirror means 14 is adapted to rotate concentrically about the tower on an annular pond 18, confined by annular pond walls 20.

Radiations from the sun strike the reflective surfaces of the mirror means 14 and are reflected onto the tower 10, where their solar energy is converted into heat. As will be described hereinafter in more detail, different circumferential portions of the mirror means are differently angled in azimuth so as to achieve the desired reflection of the solar radiations onto the tower 10 for any given azimuth position of the sun between the horizons. The boat supporting the mirror means is rotated clockwise as viewed from above, at least in the northern hemisphere, at a rate synchronous with the apparent motion of sun from east to west, so that the desired reflection of solar radiations onto the tower is maintained during all or nearly all of the daytime hours.

As will also be described in more detail hereinafter, the tower 10 is provided with conduit means for effecting a flow through it of a heat absorbing fluid, which is supplied to the tower in its cooler state and heated by the absorbed solar radiations as it traverses the tower. This heat-absorbing fluid is supplied from the heat utilization and control station 22 and is returned thereto in heated form to effect whatever heat-utilization is desired, for example driving of mechanical equipment or generation of electrical current. The station 22 is positioned centrally of the annular region defined by pond walls 20 so as to be fixed to the ground, and accordingly the circulation of the heat absorbing fluid to and from the tower 10 presents no special problems of rotating parts or flexible connections.

Figure 5:
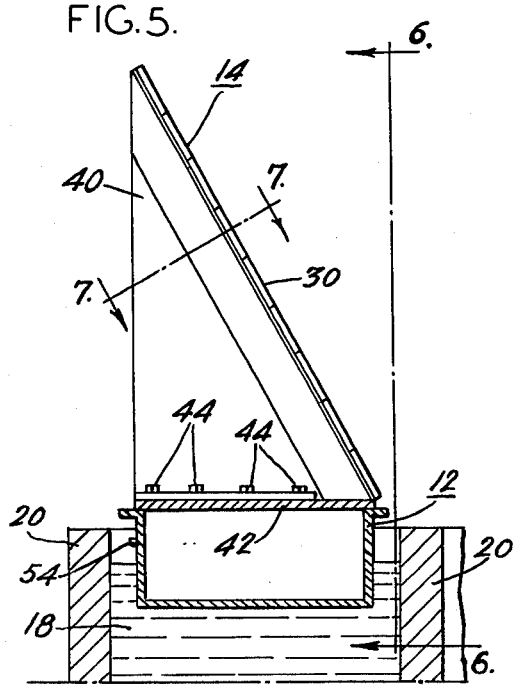
FIG. 5 is an enlarged fragment of FIG. 1, showing a typical mirror support arrangement.
Figure 6:
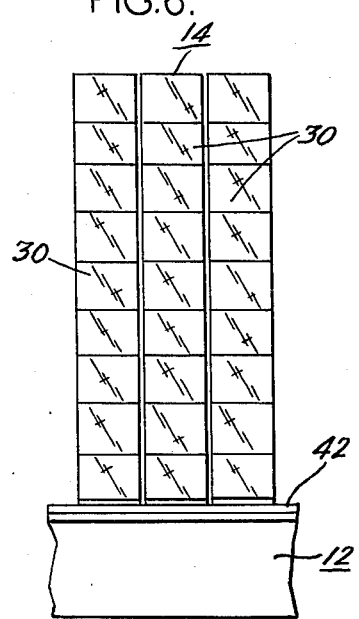
FIG. 6 is a view taken along lines 6—6 of FIG. 5.
Figure 7:
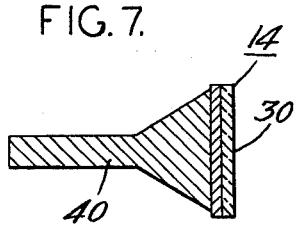
FIG. 7 is a view taken along lines 7—7 of FIG. 5.

Referring now especially to FIG. 2, the arrangement and operation of the mirror system for maintaining the reflection of solar radiations onto the tower will now be described. The mirror means 14 in this example consists of a substantially semicircular array of circumferentially-spaced plane mirrors such as 30, a representative one of which is shown in more detail in FIG. 5 and three adjacent ones of which are shown in FIG. 6. In FIG. 2 it is assumed that north is upward on the page of drawing, and that the hour is solar noon. It is also assumed that the geographical location of the system is at least somewhat north of the position of the sun, which would always be true for locations north of the Tropic of Cancer. The radiations I incident on the mirrors are all therefore directed northward, and each mirror is individually oriented in azimuth so as to reflect its incident light onto the tower 10. Once so set, the mirror azimuth angles remain stationary, and four quadrature-spaced rimdrive motors such as 34 act between the outer wall of the pond and the outer edge of the boat 12 to center the boat within the pond and to rotate the boat about the tower at speeds which maintain the azimuth angle of incidence of the sun upon each mirror at the same angle as is shown in FIG. 2. Accordingly, reflection of the sun's radiations onto the tower 10 will be maintained, at least during daylight hours. During nighttime hours, the same approximate rate of rotation may be continued so that when the sun rises again, the mirrors will all be suitably oriented to provide the desired azimuth angle of reflection.

It will be understood that the optimum azimuth angular position of any elemental mirror surface with respect to the incident solar radiations is slightly different for each slightly different circumferential position of the mirror surface about the central absorber tower. Thus ideally one would employ a continuously-varying angle of mirror surface as one progresses circumferentially around the mirror array. However, by using a large number of individual plane mirrors, as shown, the desired focusing of the reflections upon the axis of the tower is sufficiently provided, due to the substantial diameter of the tower which makes absolute accuracy of focusing of radiations on the tower axis unnecessary. Of course if desired, each individual mirror itself may be curved in the horizontal plane so as to provide the optimum continuous circumferential variation in angle for most accurate focusing upon the center of the tower. It is also possible, rather than tilting each of the mirrors differently about a vertical axis, to tilt each about some other axis, so long as the appropriate final angular arrangement is obtained. For example, the mirrors may be mounted so that the longitudinal axis of each is directed toward the axis of the tower, and each mirror tilted appropriately about its axis to provide the desired reflection onto the tower. The particular arrangement for orientation of the individual mirrors shown in the drawings has the advantage of clarity of exposition, and also provides for simple and firm support and adjustment of the individual mirror angles. Thus as shown for example in FIG. 5, each mirror 30 may be mounted flat against a backing support 40, which in turn is angularly set in the desired position on the top deck 42 of the boat 12, and then bolted into the desired fixed position by means of bolts such as 44.

Figure 3:
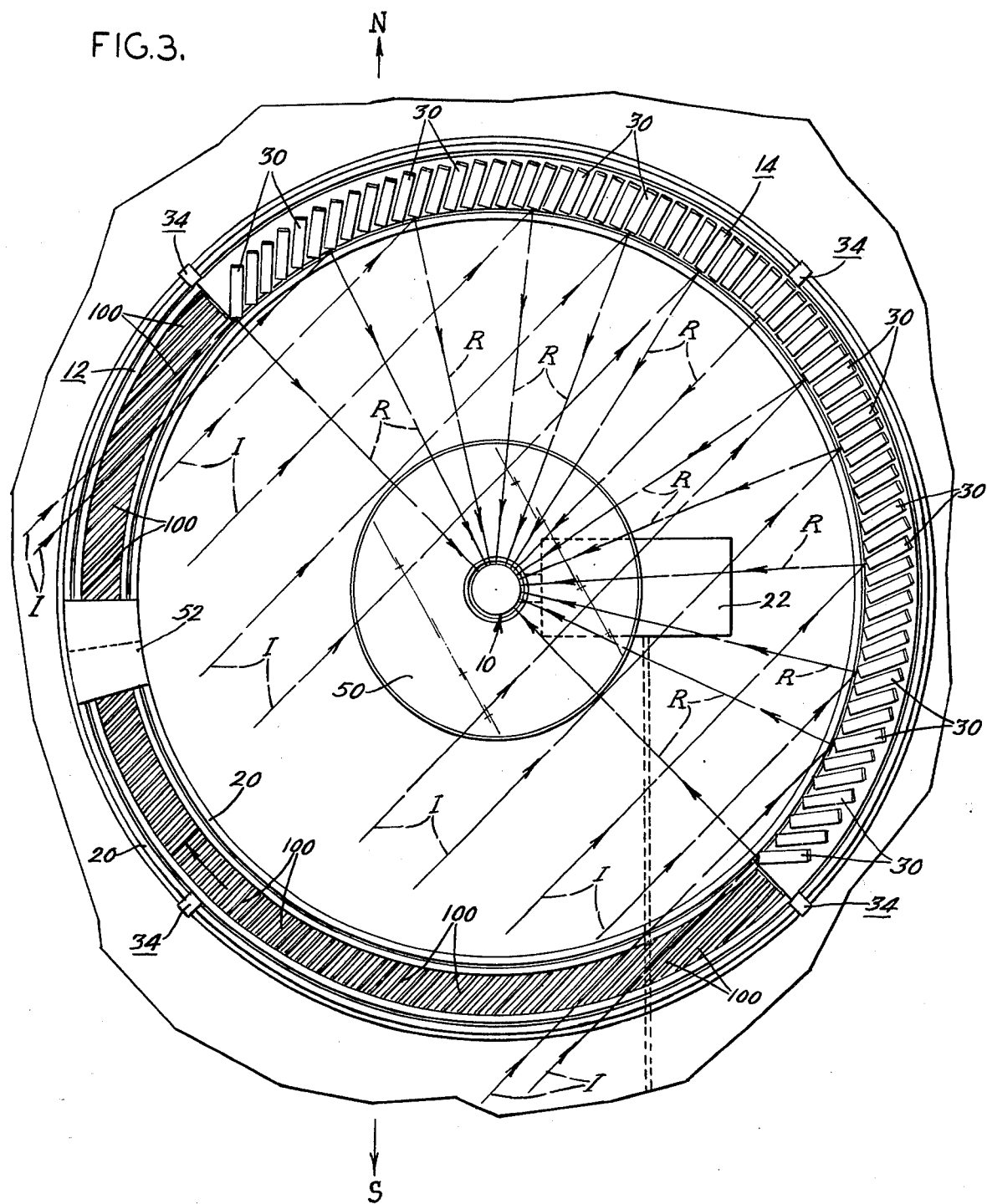
FIG. 3 is a view like that of FIG. 2, but showing the system as it would appear at about 3 P.M.

FIG. 3 shows the arrangement of FIG. 2 as it would appear at about 3 P.M. The solar radiations now arrive from an approximately southwest direction, but the boat 12 and the mirror means 14 mounted on it have now been turned counterclockwise so that the incident radiations strike the mirrors at exactly the same angle as before, and accordingly the radiations remain focused in azimuth upon the central absorber tower. The same situation exists at all times during the daylight hours because of the tracking of the azimuth angle of the sun by the rotating mirror assembly.

Figure 4:
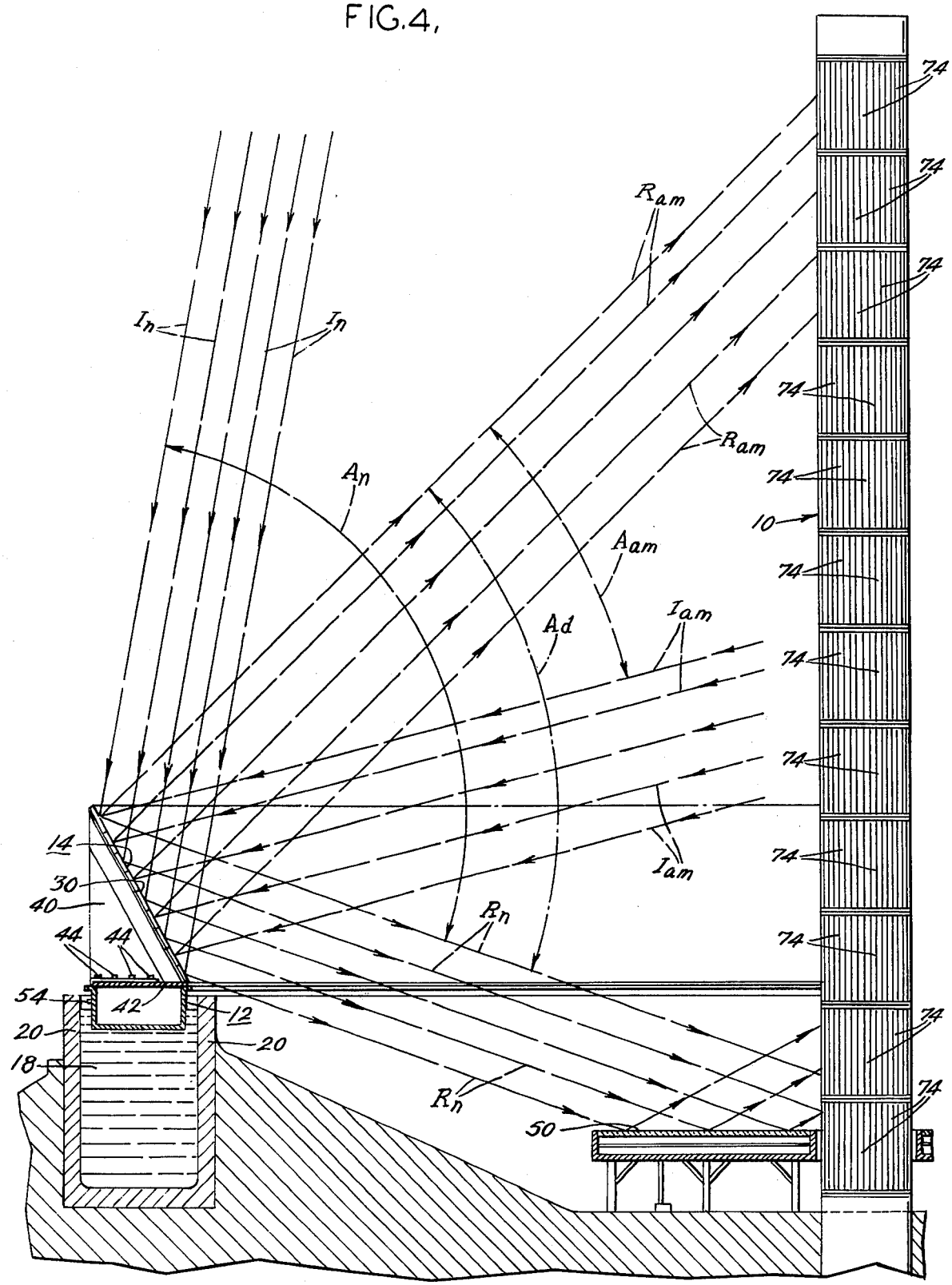
FIG. 4 is an enlarged fragment of the view of FIG. 1, showing the paths of solar radiation at noon and at about 7:30 A.M. at about 40° north latitude viewed at right angles to the rays in each case.

Thus far the inventive embodiment has been discussed with reference to its operation in azimuth only. The sun, of course, not only apparently travels from east to west, but also apparently rises and sets, so as to have a continuously changing elevational angle with respect to the local horizontal. Thus, referring to FIG. 4 there are shown two sets of incident and reflected solar rays striking a given mirror at different times of day, as they would appear to an observer on the boat looking horizontally at right angles to the rays at the two different times. Thus, more specifically, the rays $I_n$ indicate a typical direction of incident solar rays impinging the mirror surface at noon, and the rays $R_n$ represent the reflected noon-day rays, the elevation angle $A_n$ between the incident and reflected rays being quite large; the incident rays $I_{am}$ represent those typically striking the mirror at about 7:30 A.M., while the reflected rays $R_{am}$ represent the reflections of these early-morning incident rays and $A_{am}$ the elevation angle between $I_{am}$ and $R_{am}$. It is noted that the noon-time rays are in this case reflected downwardly, while the early-morning rays are reflected upwardly.

While it is possible to utilize a central solar radiation absorber confined to the upper end of the tower 10 and to ensure impingement of such an absorber by the reflected rays throughout the day as the sun changes its apparent elevation angle, this would normally require a mounting for each mirror permitting it to swing about a horizontal axis, together with separate individual drives for each such mirror arranged so as to track the elevation angle of the sun and assure that the reflected rays would reach only the selected upper end of the tower 10. Such an arrangement is quite complex, costly, and difficult to adjust and maintain, and accordingly in the present embodiment substantially the entire length of the tower is made to be solar radiation energy absorbent, and the region of the tower impinged by the reflected rays moves from the top to the bottom and back again to the top each day, heating that portion of the tower which is impinged at any given time.

Thus due to the changing elevational angles of the sun with respect to the horizontal, and the different angles $A_n$ and $A_{am}$ between incident and reflected rays at noon and at early morning, there is a substantial angle $A_d$ between the directions of the two extreme reflected rays $R_{am}$ and $R_n$ corresponding to the maximum and minimum useful elevational angles of the sun. In order to absorb solar energy from the sun's reflected rays at these two extreme conditions, and for all elevation angles between them, the energy absorbent portion of the tower 10 should subtend the angle $A_d$ as shown. For this purpose, the greater the radial distance between the central vertical axis of the tower and the mirrors, the higher the tower should be. In the present example it is convenient for this and other reasons to recess the lower end of the tower 10 below the horizontal plane of the mirrors, and in fact below the grade of the surrounding terrain, so that the noon-time reflected rays can be reflected somewhat downwardly with respect to the horizontal toward the lowered base of the tower. In addition, in this embodiment the tower slightly above its base is preferably surrounded with a substantially horizontal mirror 50, which redirects upwards the noon-time reflected rays although this is not necessary in all embodiments. This not only permits some of the noon-time rays which might otherwise strike the ground to be redirected upward against the tower, but also protects the area around the lower end of the tower from the concentrated reflected rays, thus providing a protected area below the mirror for workman and equipment, for example. It is of course possible to use other combinations of re-directing mirrors at other locations to modify somewhat the necessary location and configuration of the tower 10.

While the more conventional arrangement in which the solar radiation absorber is located at one height near the top of the tower has some thermodynamic advantages in some applications, the specific arrangement shown is not only useful but advantageous in various applications in which a time-distribution or scanning of the heating effect along the energy absorber is desirable to obtain operation in an intermediate temperature range (e.g. 148° to 600° Celsius) for which materials problems arising at temperatures above about 700° C. are avoided, and of course it is very simple since variation of the elevation angle of the mirrors is not required.

The drawings also illustrate some preferred details of embodiment and construction suitable for use in combination in the invention, although very different details of structure may be utilized instead. Thus there is shown a washer and drier station 52 fixedly mounted over the positions traversed by the mirror means, as shown particularly in FIGS. 1 and 2. The washer and drier may spray the mirrors with a suitable cleaning fluid as they pass beneath it, and then subject them to infra-red heat for drying purposes.

Figure 8:
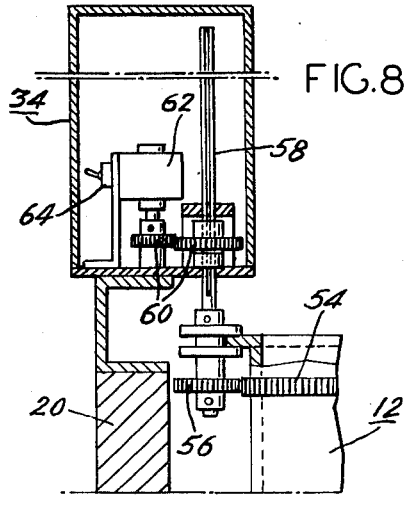
FIG. 8 is a fragmentary sectional view, taken along lines 8—8 of FIG. 2, illustrating one possible mechanism for driving the mirror array rotationally.

FIG. 8 shows a boat drive arrangement similar to that described and shown in our above-identified co-pending application, which is adapted to transfer the desired drive to the outer edge of the boat while accommodating upward and downward motion of the boat such as may be produced either inadvertently or intentionally by a rising and falling of the level of the liquid in the pond 18. To this end, the boat is provided with a peripheral toothed gear 54 which meshes with a driving gear 56 carried on the lower portion of a vertically-slidable shaft 58, which in turn is driven through a pair of gears 60 by a motor 62 mounted to the wall 20 outward of the boat and suitably controlled as to direction and speed of rotation by control box arrangement 64. A more detailed discussion of the construction and operation of this mechanism is set forth in the above-cited co-pending application; it suffices for the present purposes to indicate that this drive mechanism provides the desired direction and speed of rotation of the boat at all times so as to maintain the reflected solar radiations in azimuthal alignment with the central absorbing tower, while accommodating up and down motion of the boat in the pond, and also permits more rapid rotation of the boat when desired to move it initially into the desired alignment after a stoppage or fortuitous misalignment.

With regard to the central absorber tower 10, it is possible to construct such a tower of substantial height and diameter by erecting, about a vertical central supporting cylinder of concrete or the like, a plurality of radiation-absorbent pipes each surrounded by an evacuated cylindrical glass envelope and each extending the full height of the tower, to one end of which pipes the fluid to be heated is delivered by appropriate conduits. However, for the very tall towers which often are to be used for high power generation, it is preferred to provide vertically-spaced apart platforms about the supporting cylinder, insert sections of radiation absorbent pipe and surrounding glass envelope between the platforms, and join the successive sections together appropriately as they are installed.

Thus, more particularly, in the embodiment shown in FIGS. 9–12, the main structural element of the tower is the internal cylindrical vertical column 68, which may be of reinforced concrete or the like and may contain suitable elevators, service floors, etc. (not shown). Along the exterior of the tower are mounted longitudinally spaced-apart support platforms such as 70, which may be annular, secured to the outside of the main column 68 as by bolts 70a (FIG. 12), and circumferentially segmented into separate sections having adjacent flanges such as 71 held together by appropriate nuts and bolts such as 72, 73 in FIG. 12.

Each annular support platform 70 supports the adjacent ends of an annular outer ring of relatively larger-diameter light-absorptive tubular light absorber units such as 74, and a radially-inward ring of smaller diameter cylindrical light absorber units such such as 76. The outer light absorber units 74 are preferably spaced slightly somewhat apart, and each of the inner ring of smaller diameter absorber units is preferably placed in radial alignment with the space between the larger diameter absorber units, so as to be impinged by light passing between or through the translucent glass envelopes of the larger-diameter absorber units.

Figure 13:
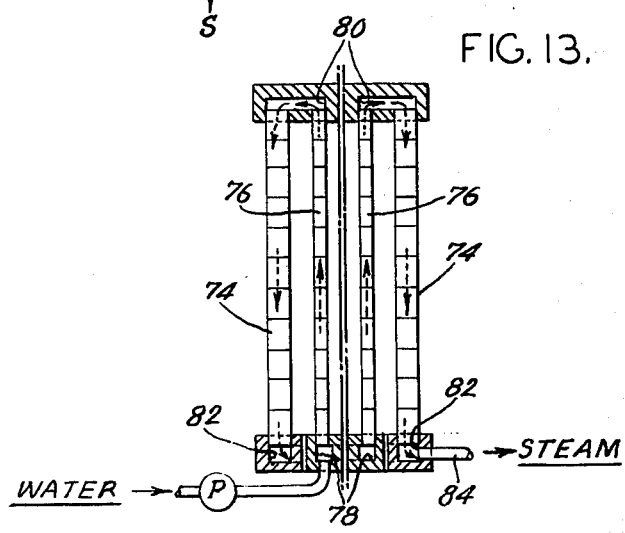
FIG. 13 is a schematic illustration of the fluid flow path through the solar absorber.

In this example, as illustrated schematically in FIG. 13, the fluid which is intended to absorb heat, which might be water, is forced upwardly through the inner row of smaller-diameter tubes as by a pump P, by way of a lower annular manifold 78, to an upper annular manifold 80 from which the fluid descends through the larger-diameter energy absorber tubes 74 to another lower annular manifold 82, and thence to an outlet line 84 for delivery to the heat utilization device. The fluid 84 may be steam, used to drive a turbine to produce mechanical motion, or to drive an electrical generator. At night-time, or whenever the fluid temperature or pressure drops below a minimum value, the flow of fluid can be turned off, if desired.

Referring to FIG. 11, each tubular absorber may be of known form, consisting of an inner pipe such as 90 provided with a conventional outer coating of solar radiation absorbent material and surrounded by a conventional glass envelope such as 92, the space between pipe and envelope being evacuated and sealed by seals such as 94. In this example the pipes are provided with flanges such as 95 at their ends, by which they can be bolted at each end to the platform 70, as shown. Appropriate high-temperature sealing and insulating gasket rings such as 96 may be provided, as well as heat-insulating rings such as 97 covering the inner surfaces of the openings in platforms 70, where the platform would otherwise contact the hot circulating fluid. A resilient ring such as 98 may also be placed under the ends of the glass envelope to provide some additional support and vibration damping for the envelope. The absorbers such as 76 in the inner ring of absorbers may be made and secured together in the same general manner.

In a preferred embodiment, as shown particularly clearly, in FIG. 2, the semi-annulus of the boat not occupied by the above-described mirrors may instead be substantially filled with horizontal trough-like reflectors such as 100 each having a suitable solar energy absorptive conduit along its horizontal line focus, these units typically being like those shown and described in the co-pending application Ser. No. 783,069 filed Mar. 30, 1977, entitled "Apparatus for the Collection and Conversion of Solar Energy." The lines of focus of the trough-like reflectors are aligned in vertical planes passing substantially through the apparent center of the sun, as described in the last mentioned co-pending application, and fluid is pumped into and out of the horizontal light-absorbing pipes by way of suitable manifolds, the heated fluid being used for any suitable energy utilization purpose. In this way, the portion of the annular boat not occupied by the mirror means 14 may be utilized for solar energy conversion in the manner described in the last-mentioned co-pending application so as not to waste this portion of the rotating boat, while also serving to counterbalance the weight of the mirror means 14 on the opposite half of the boat. An arrangement can also be provided which uses; such trough-type collectors to heat the pond water in a very simple and direct way, without requiring special rotating joints or flexible connections, in which the solar-radiation heated fluid is passed through a heat-exchanger in the underlying pond.

If desired, any of the mirrors shown may be of polished metal or of some other substance than glass, and each or any of them may be mounted on a support through which fluid is passed to hold down the temperature of the mirrors when subjected to continuous high levels of solar radiation; if desired, the cooling fluid may itself, after heating by the mirrors, be used as a source of heat for useful purposes.

It is also possible to make the annulus of FIG. 2 much wider than shown, and in fact to utilize a boat which is nearly fully circular except for a center region containing the tower and a small control and energy utilization station. In this event the additional rotating area of the boat may be filled with mirrors suitably oriented to augment the reflection of solar light onto the central absorbing tower, or may be covered with trough-like reflector arrangements similar to those described above.

As in the system of our above-cited application, other means of accomplishing flotation may be used, or the mirror means may be rotated on bearings or by means of wheels, for example.

It is also possible to provide elevational tracking of the sun, by controlled tilting of the mirror means as a whole, to focus the reflected solar rays on a preselected portion of the length of the tower, with the solar radiation absorber limited to this portion of the tower. It is also possible to rotate the absorber in synchronism with the mirror array, or to move the absorber up and down along the tower to follow the position of concentration of the mirror-reflected rays.

While the invention has been described with particular reference to specific embodiments in the interest of complete definiteness, it will be understood that it can be embodied in a variety of forms diverse from those specifically shown and described, without departing from the spirit and scope of the invention as defined by the appended claims.

What is claimed is:

1. A system for the collection and conversion of solar radiation energy, comprising:
    a central absorber of solar radiation energy;
    mirror support means, and mirror means positioned on said mirror support means to provide reflection of said solar radiation energy onto said central absorber; and
    means for rotating said mirror support means about an axis through said central absorber, at a rate synchronized with the daily apparent east-west motion of the sun, so as to maintain said reflection of said solar radiation energy upon said central absorber during said daily motion of the sun wherein said mirror support means comprises buoyant means on which said mirror means are mounted, said system also comprising flotation means for floating said buoyant means and said means for rotating said mirror support means comprising means for rotating said floating buoyant means wherein said central absorber is secured to the earth, independent of said buoyant means.

2. The system of claim 1, comprising a plurality of horizontal trough-like reflectors each having a solar-energy absorptive member disposed along its horizontal line focus, each of said line foci lying in a vertical plane passing through the apparent position of the sun.

3. A system for the collection and conversion of solar radiation energy, comprising:
   an absorber of solar radiation energy, extending upward from the ground along a predetermined axis therein, and fixed with respect to the ground;
   mirror support means rotatable as a unit about said axis;
   a plurality of mutually discrete mirror means secured to said mirror support means to rotate therewith and to provide reflection of said solar radiation energy onto said absorber; and
   means for rotating said mirror support means about said axis at a rate synchronized with the daily apparent east-west motion of the sun, so as to maintain said reflection of said solar radiation energy upon said absorber during said daily motion of the sun, while maintaining each of said mirror means angularly fixed with respect to said mirror support means.

4. A system for the collection and conversion of solar radiation energy, comprising:
   a central absorber of solar radiation energy;
   mirror support means, and mirror means positioned on said mirror support means to provide reflection of said solar radiation energy onto said central absorber; and
   means for rotating said mirror support means substantially only about a substantially vertical axis through said central absorber, and substantially in a horizontal plane, at a rate synchronized with the daily apparent east-west motion of the sun, so as to maintain said reflection of said solar radiation energy upon said central absorber during said daily motion of the sun, the elevation angles of said mirror means being substantially constant during said daily motion of the sun, and said central absorber comprising a portion extending substantially along said vertical axis.

5. The system of claim 4, wherein said portion of said central absorber is sufficiently long, compared with the distance from said mirror means to said portion, that said solar radiation energy is reflected onto and scanned along said portion over a major part of the daylight hours.

6. A system for the collection and conversion of solar radiation energy, comprising:
   a central absorber of solar radiation energy;
   mirror support means, and mirror means positioned on said mirror support means to provide reflection of said solar radiation energy onto said central absorber; and
   means for rotating said mirror support means about a substantially vertical axis through said central absorber at a rate synchronized with the daily apparent east-west motion of the sun, so as to maintain said reflection of said solar radiation energy upon said central absorber during said daily motion of the sun, said central absorber comprising a portion extending substantially along said vertical axis;
   said mirror support means comprising buoyant means on which said mirror means are mounted, said system also comprising flotation means for floating said buoyant means, and said means for rotating said mirror support means comprising means for rotating said floating buoyant means;
   wherein said portion of said central absorber is sufficiently long, compared with the distance from said mirror means to said portion, that said solar radiation energy is reflected onto and scanned along said portion over a major part of the daylight hours.

7. The system of claim 6, wherein said mirror means comprise a plurality of mirrors arranged side-by-side in an arcuate assembly, with each adjacent mirror mounted at a slightly different azimuth angle with respect to its neighboring mirrors.

* * * * *